Oct. 31, 1939.   L. BIRKIGT   2,178,297
INTERNAL COMBUSTION ENGINE
Filed Oct. 21, 1938   2 Sheets-Sheet 1
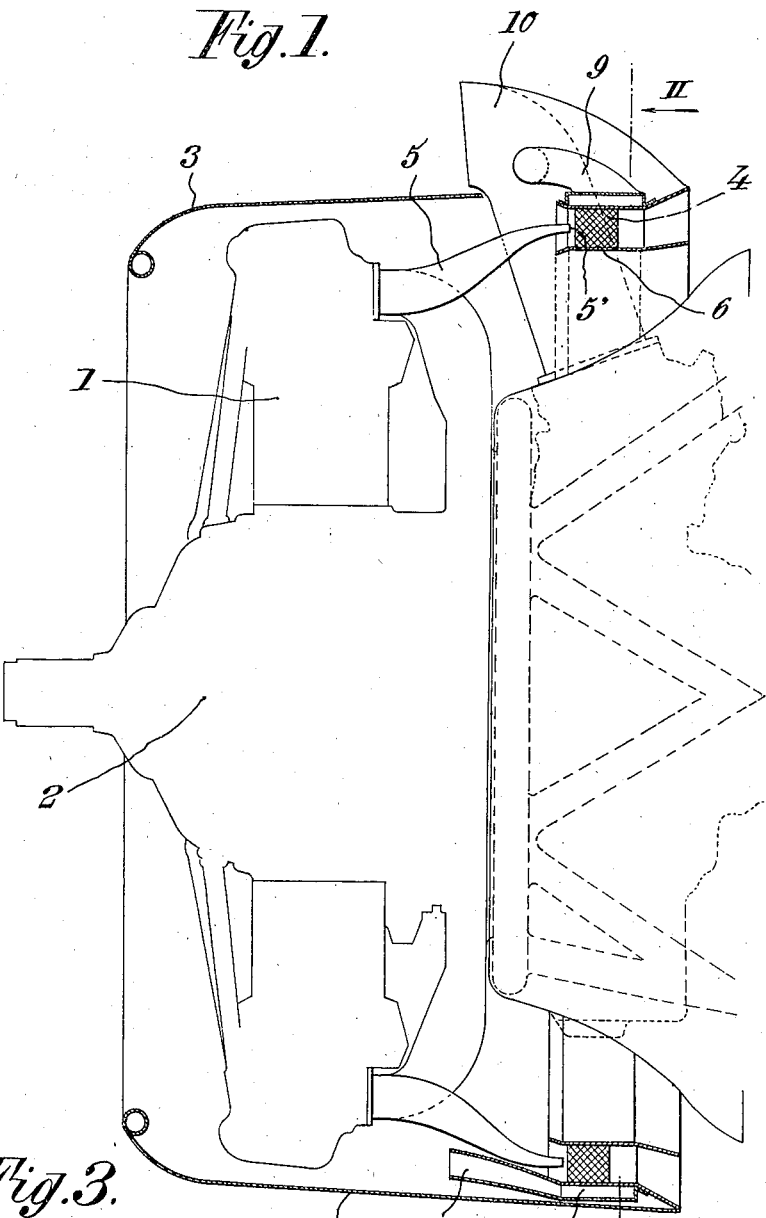
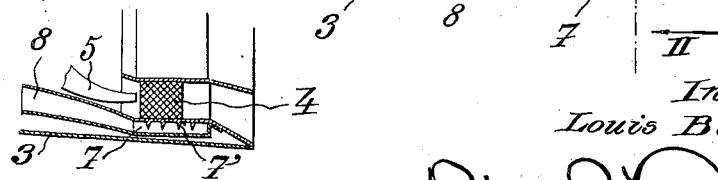
Inventor:
Louis Birkigt,
Attorneys

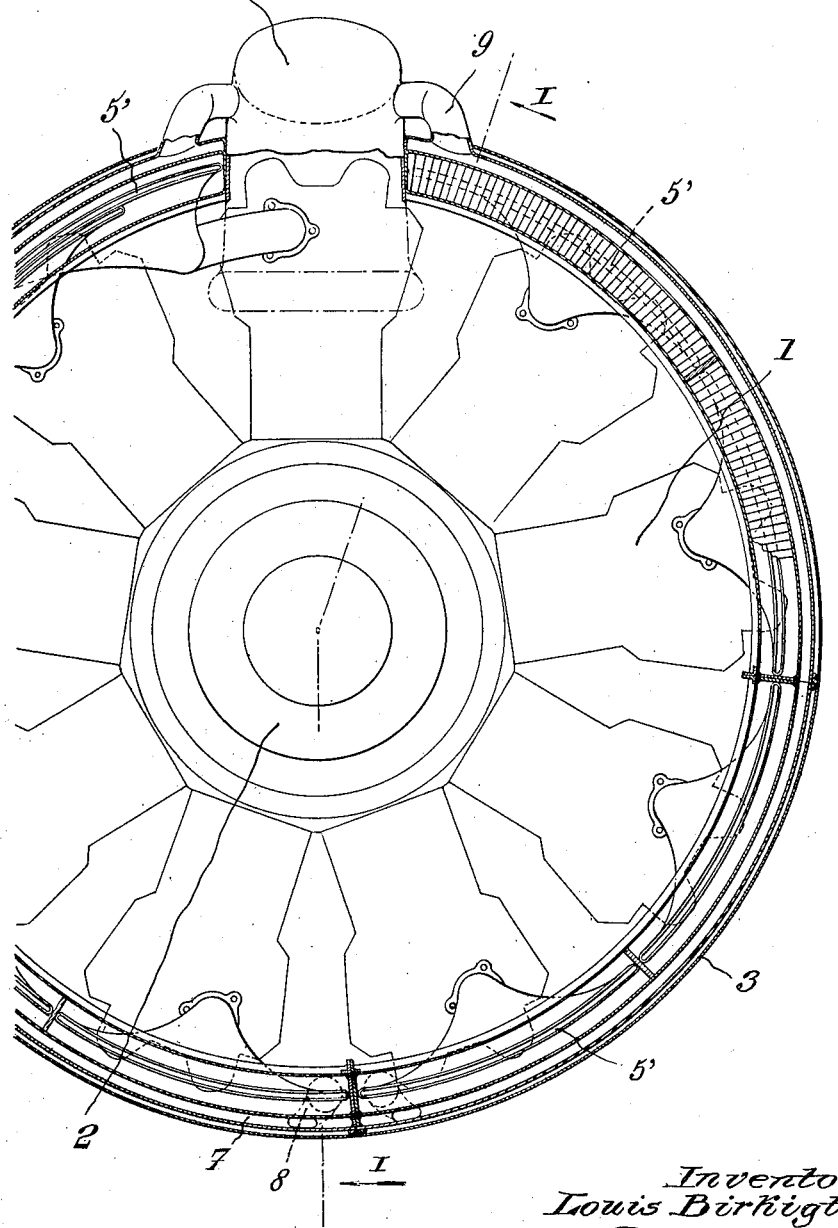

Patented Oct. 31, 1939

2,178,297

UNITED STATES PATENT OFFICE 2,178,297

INTERNAL COMBUSTION ENGINE

Louis Birkigt, Versoix, near Geneva, Switzerland

Application October 21, 1938, Serial No. 236,368
In Belgium May 19, 1938

13 Claims. (Cl. 123—122)

The present invention relates to internal combustion engines, and it is more especially, although not exclusively, concerned with internal combustion engines for use on aircrafts, and in particular simple or multiple bank radial engines.

The chief object of the present invention is to provide an engine of this kind which is better adapted to meet the requirements of practice than existing engines of the same kind.

According to the essential feature of the present invention, the internal combustion engine is provided with at least one exhaust flame damping device, in combination with means for recovering a part of the calories transmitted by the exhaust gases to said device, the calories thus recuperated being advantageously utilized for heating at least a part of the air fed to the engine.

According to another feature, which relates more especially to the case of simple or multiple bank radial engines, the exhaust conduits of the engine are arranged in such manner as to be each of flat outlet section and arranged along a line the general direction of which is substantially concentric to the apparent contour of the engine. Furthermore, the outlet sections of the conduits corresponding to the respective cylinders of the engine are preferably arranged in contiguous relation to one another, in such manner that the exhaust gases total outlet section is of annular shape and of relatively small thickness.

Other features of the present invention will result from the following detailed description of some specific embodiments thereof.

Preferred embodiments of the present invention will be hereinafter described, with reference to the accompanying drawings, given merely by way of example, and in which:

Fig. 1 is a longitudinal sectional view on the line 1—1 of Fig. 2 of a radial engine for an aircraft, made according to the present invention;

Fig. 2 is a transverse sectional view on the line 2—2 of Fig. 1;

Fig. 3 is a detail view showing a modification of some elements of the engine.

In the following description with reference to the drawings, it will be assumed that the invention is applied to the case of an internal combustion engine of the simple radial type, intended for use on an aircraft.

The general structure of this engine is made in the usual fashion, in such manner that it includes a plurality of cylinders 1, for instance nine cylinders, distributed at equal intervals along the periphery of a crankcase 2, said cylinders being advantageously surrounded by an annular cowl 3, of any suitable type, capable of guiding and improving the flow of the air streams.

This engine is fitted with at least one exhaust flame damping device 4, capable of absorbing, at least partly, the flames that may flow out from the exhaust conduits 5 of each of these cylinders.

According to the essential feature of the present invention, I provide means, in combination with this device, for recuperating a portion of the calories given off by the exhaust gases of the engine to said damping device 4. The calories thus recuperated are utilized for any useful purpose, and in particular, as it will be supposed in the remainder of the description, by way of example, for heating at least a portion of the air fed to the engine for the working thereof.

I will first consider the exhaust conduits 5 with which the flame damping device 4 is to coact. These conduits may be arranged in any suitable manner but I have found that it is preferable to arrange them in a particular manner which constitutes another feature of the present invention.

According to this feature, which may be utilized independently of the first mentioned one, each of the outlet conduits has an outlet 5' of flat section, and the general line of this flat outline is substantially concentric to the apparent contour of the engine. Furthermore, the various outlet sections 5' are preferably arranged in contiguous relation to one another so that the total outlet for the exhaust gases is of annular shape and reduced thickness.

Furthermore, advantageously, according to the present invention, the cross section of each exhaust conduit 5 is of equal area over the whole length of said conduit, in such manner that no variations occur in the conditions of flow of the exhaust gases through said conduit.

With such an arrangement, I obtain the following advantages:

a. The particular drag corresponding to the exhaust pipes is reduced to a minimum and it is easier to accommodate said exhaust pipes inside the annular cowl 3;

b. The flattened shape of the sections of the exhaust conduit outlets 5' is favorable to a satisfactory cooling of the streams of the exhaust gases, due to the fact that the external area of each of said streams is considerable as compared with the area of the cross section thereof.

c. The fact that the total exhaust section is continuous will permit the flow of a gaseous stream of substantially annular shape capable of improving the flow of air through cowl 3, this circulation of air improving the evacuation of the exhaust gases from the cylinders.

Concerning now the exhaust gases damping device 4, it can be made of any suitable conventional type (including fins, baffles, grids, and so on), but it should be adapted to the particular structure of the exhaust conduits 5.

In particular, if said conduits are made, as above described, in such manner that the total section of the outlets is substantially annular, for the exhaust gases, it will be advantageous to comply with the following conditions:

a. This damping device is to be made also of annular shape;

b. Said damping device is to be mounted in a kind of annular Venturi tube 6 adapted to facilitate the flow of the gaseous stream.

Finally, concerning the means for transmitting to a part of the feed air the calories recuperated in the flame damping device, such means may, advantageously, be arranged in such manner as to produce a direct thermic interchange between said device and the air to be heated.

Advantageously, said means are made in the following manner, indicated merely by way of example:

I provide, on the periphery of the flame damping device 4, an air jacket 7, of annular general shape, made for instance of two elements each of which corresponds to said device 4 over a circular arc of about 180°. The inner wall of this jacket 7 may be provided with means for facilitating the transmission of means. For instance, as shown by Fig. 3, these means consist of fins 7' or the like.

Each of these elements of the transmission means is provided on the one hand with at least one air intake conduit 8, preferably housed on the inside of cowl 3, and, on the other hand, with a collector 9 which advantageously opens into the engine air inlet 10, the heated air coming from said collector being thus mixed to the main feed stream flowing to said engine.

I might further provide, on the heating circuit for said feed air, regulating means adapted to control, either at will or automatically, the flow of air through said circuit and, consequently, the heating capacity of the means which transmit heat to the engine feed air.

Whatever be the specific arrangement that is chosen, I obtain an internal combustion engine for an aircraft, provided with means for heating a portion of the feed air for said engine, which works, in connection with said means, in a manner resulting sufficiently clearly from the above description for making it unnecessary to give any further explanation concerning said operation.

All possible embodiments of an internal combustion engine made according to the present invention have, in addition to the advantages above set forth concerning the shape of the exhaust conduits, the following advantages:

They include means for heating the air feed and therefore improving the efficiency thereof and minimizing the risks of freezing up of the carburetter, and these means do not materially increase the drag of the whole of the aircraft but serve, on the contrary, to facilitate the flow of the cooling air through the annular cowl which surrounds the engine cylinders.

Of course, it should be made clear that, according to the present invention, the calories recuperated from the flame damping device might be utilized for purposes other than for heating the engine feed air, for instance for conditioning the atmosphere inside the aircraft cabin.

Also, it is clear that the arrangement relative to the recuperation of calories from the flame damping device might be applied to engines of a type other than the radial type.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. An internal combustion engine which comprises, in combination, a plurality of cylinders, of radial arrangement, a cowl for said cylinders, exhaust conduits for said cylinders, a device mounted at the outlet of said exhaust conduits for damping flames flowing out from said conduits, a jacket provided on said flame damping device, said jacket having an inlet opening in communication with the inside of said cowl, and a conduit for feeding air to said engine, said jacket having an outlet opening in communication with said last mentioned conduit.

2. An internal combustion engine which comprises, in combination, a plurality of radial cylinders, exhaust conduits for said cylinders, the respective outlets of said exhaust conduits being of flattened cross section, with their general lines concentric with the outer circumference of the engine, means associated with the outlets of said exhaust conduits for damping flames flowing out through said conduits, and heat recuperating means associated with said flame damping means.

3. An internal combustion engine of the radial type which comprises, in combination, at least one circumferential bank of cylinders, exhaust conduits for said cylinders, the respective outlets of said exhaust conduits being of flattened cross section, with their general lines concentric with the outer circumference of said engine, means at the outlets of said exhaust conduits for damping flames flowing out through said conduits, means for feeding air to said engine, and heat recuperating means associated with said flame damping device for giving off at least a portion of the heat recovered from said flame damping device to said air feeding means.

4. An internal combustion engine of the radial type which comprises, in combination, at least one circumferential bank of cylinders, exhaust conduits for said cylinders, the respective outlets of said exhaust conduits being of flattened cross section, with respective general lines concentric with the outer circumference of the engine, the cross sections of each exhaust conduit being of uniform area throughout the length thereof, means at the outlets of said exhaust conduits for damping flames flowing out through said conduits, and heat recuperating means associated with said flame damping means.

5. An internal combustion engine of the radial type which comprises, in combination, at least one circumferential bank of cylinders, exhaust conduits for said cylinders, the respective outlets of said outlet conduits being of flattened section, with their general lines concentric with the outer circumference of said engine and the cross sections of each exhaust conduit being of uniform area throughout the length thereof, means at the outlets of said exhaust conduits for damping flames flowing out through said conduits, means for feeding air to said engine, and heat recuperating means associated with said flame damping means for giving off a portion of the heat recovered from said flame damping means to said air feeding means.

6. An internal combustion engine of the radial type which comprises, in combination, at least one circumferential bank of cylinders, exhaust conduits for said cylinders, the respective outlets of said exhaust conduits being of flattened cross section, with respective general lines concentric with the outer circumference of the engine, said flattened outlets being arranged in contiguous relation so that they form together a continuous annular exhaust outlet, means at the outlets of said exhaust conduits for damping flames flowing out through said conduits, and heat recuperating means associated with said flame damping means.

7. An internal combustion engine according to claim 6 in which the cross sections of each exhaust conduit are of uniform area through the length of said conduit.

8. An internal combustion engine of the radial type which comprises, in combination, at least one circumferential bank of cylinders, exhaust conduits for said cylinders, the respective outlets of said outlet conduits being of flattened section, with their general lines concentric with the outer circumference of said engine and the cross sections of each exhaust conduit being of uniform area throughout the length thereof, said flattened outlets being arranged in contiguous relation so that they form together a continuous annular exhaust outlet, means at the outlets of said exhaust conduits for damping flames flowing out through said conduits, means for feeding air to said engine, and heat recuperating means associated with said flame damping means for giving off a portion of the heat recovered from said flame damping means to said air feeding means.

9. In an internal combustion engine which comprises, in combination, a plurality of cylinders, exhaust conduits for said cylinders, the outlets of said exhaust conduits being arranged along a closed curve, an annular device mounted at the outlets of said exhaust conduits for damping flames flowing out from said conduits, the annular form of said device corresponding to the form of the closed curve along which said outlets are arranged, and heat recuperating means associated with said flame damping means.

10. An internal combustion engine according to claim 9 in which the outlets of said exhaust conduits are arranged on a circular line.

11. An internal combustion engine which comprises, in combination, a plurality of cylinders, exhaust conduits for said cylinders, the respective outlets of the exhaust conduits being of flattened cross section with their respective general lines lying on a closed curve, means at the outlets of said exhaust conduits for damping flames flowing out through said conduits, said means having an annular form corresponding to said closed curve, and heat recuperating means associated with said flame damping means.

12. An internal combustion engine which comprises, in combination, a plurality of cylinders, exhaust conduits for said cylinders, the respective outlets of the exhaust conduits being of flattened cross section, means immediately behind said flattened sections for damping flames flowing out through said conduits, and heat recuperating means associated with said flame damping means.

13. An internal combustion engine of the radial type which comprises, in combination, at least one circumferential bank of cylinders, exhaust conduits for said cylinders, the respective outlets of said exhaust conduits being of flattened cross section, said flattened outlets being arranged in contiguous relation so that they form together a continuous annular exhaust outlet, means at the outlets of said exhaust conduits for damping flames flowing out through said conduits, and heat recuperating means associated with said flame damping means.

LOUIS BIRKIGT.